United States Patent
Shann et al.

(10) Patent No.: US 7,299,462 B2
(45) Date of Patent: Nov. 20, 2007

(54) RELOCATION FORMAT FOR LINKING

(75) Inventors: Richard Shann, Mathern Chepstow (GB); Stephen Jones, Bristol (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 641 days.

(21) Appl. No.: 09/850,666

(22) Filed: May 7, 2001

(65) Prior Publication Data

US 2004/0015884 A1    Jan. 22, 2004

(51) Int. Cl.
 G06F 9/45   (2006.01)
 G06F 9/44   (2006.01)

(52) U.S. Cl. .................. 717/153; 717/159; 717/162
(58) Field of Classification Search ............... 717/127, 717/130, 131, 151, 154, 162, 163, 153, 159
 See application file for complete search history.

(56) References Cited

U.S. PATENT DOCUMENTS

| | | | |
|---|---|---|---|
| 5,313,616 A * | 5/1994 | Cline et al. | 717/127 |
| 5,504,901 A * | 4/1996 | Peterson | 717/144 |
| 5,659,751 A * | 8/1997 | Heninger | 719/332 |
| 5,734,822 A * | 3/1998 | Houha et al. | 717/167 |
| 5,999,737 A * | 12/1999 | Srivastava | 717/162 |
| 6,182,283 B1 * | 1/2001 | Thomson | 717/153 |
| 6,219,830 B1 * | 4/2001 | Eidt et al. | 717/139 |
| 6,463,581 B1 * | 10/2002 | Bacon et al. | 717/154 |
| 6,546,551 B1 * | 4/2003 | Sweeney et al. | 717/154 |

OTHER PUBLICATIONS

"Patches to binutils-000516" by Richard Gorton, Posted on May 17th, 2000 to the binutils@sourceware.cygnus.com mailing list <URL http://sources.redhat.com/ml/binutils/2000-05/msg00351.html>.*

"Re: Polymorphism vs. Overloading" by Norman Ramsey, Posted on Oct. 24th, 1994 to the comp.compilers newsgroup <URL http://compilers.iecc.com/comparch/article/94-10-169>.*

(Continued)

Primary Examiner—Tuan Dam
Assistant Examiner—Derek J. Rutten
(74) Attorney, Agent, or Firm—Lisa K. Jorgenson; James H. Morris; Wolf, Greenfield & Sacks, P.C.

(57) ABSTRACT

A method of preparing an executable program from a plurality of object code modules, at least one of said object code modules including section data specifying a plurality of functions associated with relocation instructions, at least some of which functions are called in the executable program. The method comprises the steps of assigning an attribute to each function, said attribute being capable of providing an indication of whether the function is reachable, reading the section data and relocation instructions to ascertain if the function is called and setting the attribute to indicate the called status and preparing the executable program to only include functions with an indicated called status of reachable. A linker is provided for preparing the executable program from object code modules containing the relocation instructions. A computer program is provided to control the linker.

21 Claims, 9 Drawing Sheets

OTHER PUBLICATIONS

"Spike: An Optimizer for Alpha/NT Exectuables" by Robert Cohn et al., 1997, "USENIX Windows NT Workshop, 1997", pp. 17-24 of the Proceedings.*

Norman Ramsey, "Relocating machine instructions by currying", May 1996, ACM SIGPLAN Notices, Proceedings of the ACM SIGPLAN 1996 conference on Programming language design and implementation PLDI '96, vol. 31 Issue 5, pp. 226-236.*

John R. Levine, "Linkers and Loaders", Oct. 1999, Morgan-Kaufmann Publishers, ISBN 1-55860-496-0, Chapter 7.*

Debray, S. K., Evans, W., Muth, R., and De Sutter, B. 2000. Compiler techniques for code compaction. ACM Trans. Program. Lang. Syst. 22, 2 (Mar. 2000), 378-415.*

* cited by examiner

RELOCATION FORMAT FOR LINKING

FIELD OF INVENTION

The present invention relates to a relocation format for linking, and in particular to a method of linking, a linker and a computer program product containing relocation instructions.

BACKGROUND OF INVENTION

Linkers for producing executable programs are known. Generally speaking, a linker acts to link a number of object code modules to form a single executable program. Object code modules are usually generated from program source code modules, these modules being written in a high level language. An assembler/compiler reads each source code module and assembles and/or compiles the high level language of the source code module to produce an object code module. The assembler also generates a number of relocations which are used to combine the object code modules at link time in a linker.

The ELF (executable linking format) standard defines a convention for naming relocation sections belonging to a given section, e.g. rela.abc is relocation section of section .abc. Standard relocations under the ELF format allow an offset in section data to be defined where patching is to occur and a symbol whose value is to be patched. A type field also exists which is used to describe the appropriate method of encoding the value of the symbol into the instruction or data of the section data being patched. According to the existing arrangements, the relocation type definitions are usually created on an ad hoc basis for each instruction set targeted. The 32 bit ELF standard allows only 256 distinct relocation types, so the same types are reascribed to different semantics for each instruction set.

The existing linkers each have to be set up to understand the particular semantics used for the type definitions in the relocations for each instruction set. Moreover, the relocation operations which can be defined by the relocations are limited in the existing ELF standard.

A more flexible relocation format has been developed by the Applicants which, in particular, provides independence from target architecture and allows for user written optimisations of code to be accomplished at link time.

Also in known systems it is currently the case that all functions present in the object code modules are taken through the linking process even when they are not in fact used in the final linked program being generated. An example of this would be standard functions in the computer language in which the program source modules are being written. Unnecessary inclusion of un-used functions results in inefficiencies in the linked program being generated due to its excessive size.

Eliminating the code of such functions is a well-known linker relaxation (optimisation) technique called USE (uncalled subroutine elimination). One known method of performing this is for the linker to know which instruction sequences are used by the assembler/compiler to cause a branch to a function. A program is stored as code sequences most of which have been generated by the compiler to correspond with functions in a high level language (such as the C language). The program will be loaded into memory such that each sequence/function runs from a start address to an end address. One of these start addresses will be the "entry point" into the program, that is the first instruction executed by the microprocessor when the program starts. A branch instruction gives a target address within a stored program and a condition under which the branch is taken. Starting from the entry point(s) for the program being generated, the linker can follow all the possible paths (assuming both possible conditions at every branch) through these branches and thereby identify uncalled functions. This method has the disadvantage that the linker needs to be re-coded for new architectures.

Another known method makes use of the fact that the linker repeatedly reads the relocations of the object code module, each read being known as a pass. The linker pass number is stored with a symbol whenever the value of a symbol is referenced by a relocation. The linker also ensures that the entry point symbol always has the current pass number stored with it, even though usually no relocation references its value. A link time conditional instruction is then used to evaluate whether the symbol's value has been used in the current pass. Based on this condition a function labelled by the symbol can be eliminated if it is no longer referenced. This is done by using a conditional relocation to test the condition. With each pass more functions may be eliminated until the program becomes stable. For example, if function "A", which is not at the entry point, calls function "B" which in turn calls function "C", then on the second pass function A may be skipped. This results in its reference to function B being missed, but B and C are nevertheless traversed on successive passes until B and then C become un-referenced. This method has the disadvantage that if A calls B and B calls A but no other functions call either of them they will not be eliminated because A is never skipped on the first pass so its reference to function B is detected and B will be traversed which will update the pass number of A and so on for all successive passes.

It would be advantageous to provide a linker optimisation which includes the discarding of un-used functions and which mitigates the problems of the prior art.

A related problem is the use of library functions which are standard functions in the programming language in which the program source modules are being written and which are often present in object code modules. These functions can have a "full" version and a "reduced" version, which may be required in dependence on the data values being acted on by the function. The assembler/compiler can see if any given use of the function is a suitable candidate for using the reduced version, but cannot see all the program code modules taken as a whole, since it is not able to view them all together as such. This means that it can not see if there is any module which requires the full version. This is important because if there is, the full version should be used even when compiling those modules which do not require its extra capabilities, because otherwise the final executable program to be generated will contain both versions. It is inefficient use of space for the executable to contain both versions and it is not necessary because a module which only requires the reduced version of the function can equally as well use the full version. (The reverse is not true so if the full version is required anywhere this must be present in the executable program rather than the reduced version).

It would be advantageous to allow the linker to survey every use of each version of such a function so that it can make transformations of the uses of the reduced version, to use the full version.

SUMMARY OF INVENTION

According to an aspect of the present invention there is provided a method of preparing an executable program from a plurality of object code modules, at least one of said object code modules including section data specifying a plurality of functions associated with relocation instructions, at least some of which functions are called in the executable program, the method comprising the steps of: assigning an attribute to each function, said attribute being capable of providing an indication of whether the function is reachable; reading the section data and relocation instructions to ascertain if the function is called and setting the attribute to indicate the called status; and preparing the executable program to only include functions with an indicated called status of reachable.

Some of the functions may have a full version and a reduced version, in which case the attribute is capable of providing an indication of whether the full version is reachable and if it is reachable the executable program is prepared to only include the full version. Preferably the attribute is further capable of providing an indication of whether the reduced version is reachable and after the step of setting the attribute to indicate the called status of the reduced version of the function, the further step of reading the section data and relocation instructions again is carried out to ascertain if the full version of the function is called and if it is called, the attribute can be set to indicate the called status of the full version. Advantageously, if the called status of the full version is not reachable, only the reduced version is included in the executable program.

Conveniently if the full version is reachable a trust attribute for the function is set to 1 and if the said trust attribute is set to 1, only the full version is included in the executable program whether or not the called status of the reduced version becomes reachable before or after the trust attribute is so set. Usually a full version of a function is used for acting on values including floating point numbers and a reduced version of a function is used for acting on values not including floating point numbers.

Usually the step of reading the section data and relocation instructions is carried out a number of times until the attributes for all functions have been set and all occurrences of the functions have been read. Conveniently the attribute is assigned to functions by means of a relocation instruction (R_ATTACH_ATTRIB) which is capable of setting the value of an attribute attached to a symbol.

In practice reading/not reading the section data and relocation instructions is controlled by having the functions in a conditional block (R_IF, R_ENDIF). The linker automatically performs passes until no symbol changes value, whereon it sets the ready flag and makes a final pass. If the ready flag is still set it emits the resultant executable. A block of section data bracketed by R_IF R_ENDIF relocations is included in the executable or not depending on the value on the stack when the R_IF is executed. The entire LCL program is treated as a loop by the linker.

Another aspect of the invention provides a linker for preparing an executable program from a plurality of object code modules, at least one of said object code modules including section data specifying a plurality of functions associated with relocation instructions, at least some of which functions are called in the executable program, the linker comprising: an attribute assigning module for assigning an attribute to each function, said attribute being capable of providing an indication of whether the function is reachable; a section data holding module for holding section data which is subject to said relocation instructions; a relocation module for reading said section data and relocation instructions to ascertain if any function or functions are called and setting the attribute of that function/those functions to indicate the called status; and a program forming module for preparing the executable program to only include functions with an indicated called status of reachable.

The linker can comprise a stack for holding values conveyed by the relocation instructions as said relocation data.

The linker can comprise means for implementing calculations conveyed by the relocation instructions using the values on the stack.

The linker can include a condition evaluator for examining the value at the top of the stack to determine whether or not a condition is satisfied, the relocation module being operable to instruct the section data module to conditionally include sequences of the section data in the executable program based on the evaluated condition. It will be understood that unwanted code sequences are deleted.

The linker can comprise a parameter array holding a set of parameters each associated with a respective index, said parameters modifying code sequences for possible inclusion in the executable program.

The linker can comprise a symbol table which holds values in association with symbols, said symbols being conveyed by the relocation instructions.

The linker can include a condition array which holds respective values of associated indexes, the indexes being conveyed by the relocation instructions.

The invention also provides in a further aspect a computer program product in the form of an object code module which contains sets of section data specifying a plurality of functions associated with relocation instructions, at least some of which functions are called in the executable program, wherein the computer program product is cooperable with a linker to assign an attribute to each function and to set the attribute to 1 if the function to which it is assigned is reachable, in order to determine which of said functions is to be included in a final executable program formed by the linker.

BRIEF DESCRIPTION OF DRAWINGS

For a better understanding of the present invention and to show how the same may be carried into effect, reference will now be made by way of example to the accompanying drawings in which.

In the figures like reference numerals are used to indicate like parts and lower case letters are used to distinguish between several like parts.

DESCRIPTION OF PREFERRED EMBODIMENT

Figure 1:
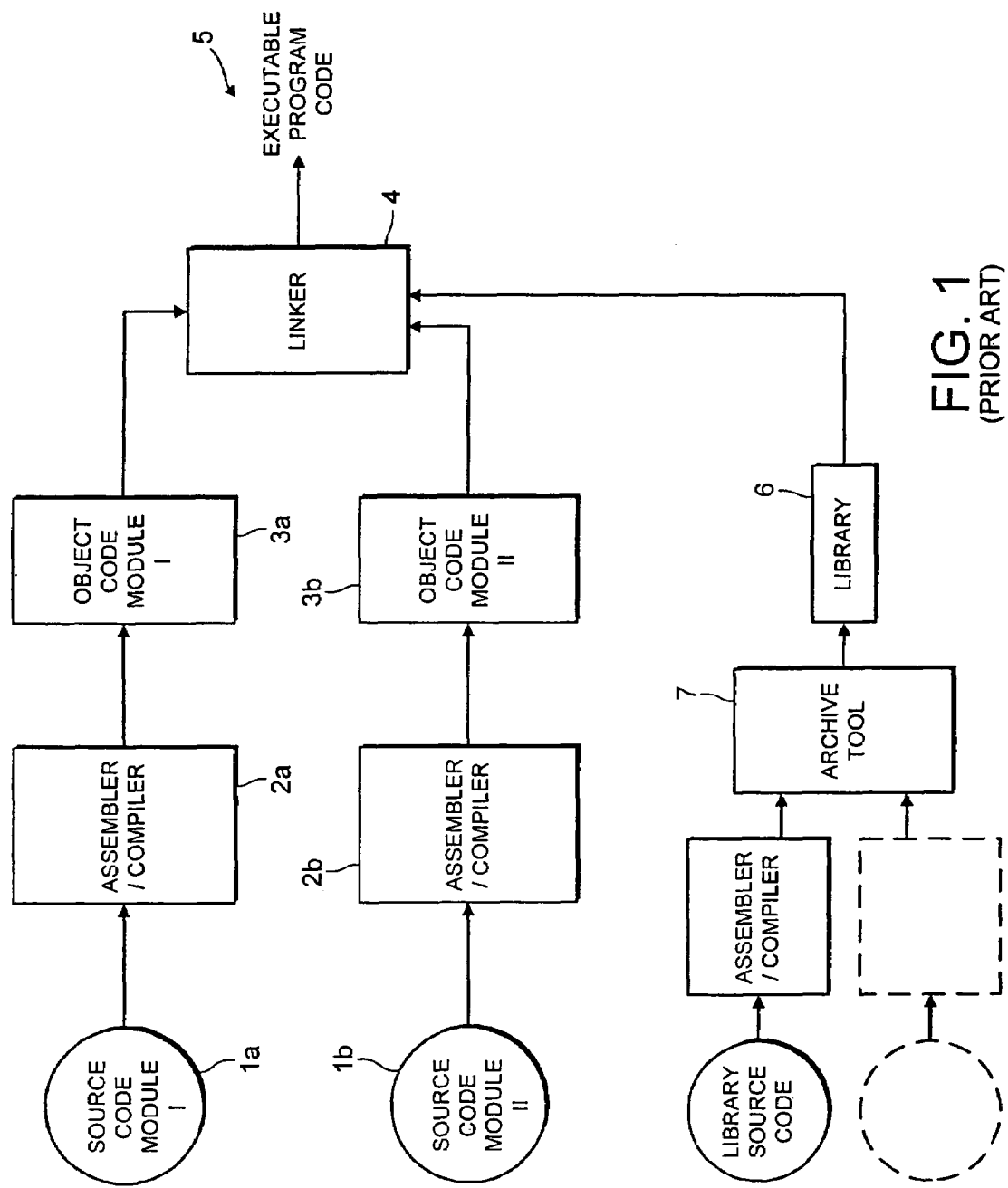
FIG. 1 is a block diagram illustrating the context of the invention.

With reference to FIG. 1, a system for linking a number of program modules to form a single executable program is shown schematically. A number of program source code modules 1a,1b, each module written in a high level language is provided. The particular high level language used for each source code module may vary from module to module, or alternatively all of the program source code modules may be written in the same high level language. Each source code module 1a,1b, is input to a respective assembler/compiler 2a,2b which assembles and/or compiles the high level language of the source code module to produce an object code module 3a,3b. Each object code module 3a,3b is the low level language equivalent to each respective source code module 2a,1b, the low level language being a language which is directly readable by a target computer into which the final resulting single executable program is to be loaded. It will be appreciated that a single assembler/compiler could be used to sequentially convert a number of source code modules to respective object code modules.

Each object code module 3a,3b is passed to a linker 4. Object code modules may be stored in libraries, such as the library 6 in FIG. 1, placed under the control of an archive tool 7. Access to these object code modules by the linker 4 is explained later. The linker combines all of the respective object code modules 3a,3b to produce a single executable program, still in the low level language suitable for the target processor into which the program is to be loaded.

For a given architecture there are often different instruction sequences for achieving the same objective depending on the values of the operands which are being handled. For example, "load a function address into a register" may be achieved in various ways depending on the address in question. When the operand is unknown before link time there is scope for re-writing the code at link time depending on the value of the operand. This re-writing of the code is a form of optimisation termed herein "linker relaxation".

In the following embodiments a scheme is described for achieving linker relaxation based on information written in assembler files and passed to the linker as special relocations. The special relocations are also used for rewriting particular instruction sequences as one of a set of known alternatives.

Each assembler 2a,2b generates an object code module 3a, 3b including sets of section data, each set of section data having a set of relocations generated by the assembler to describe how the section data is to be patched so as to render it compatible with other section data to form the program 5. These relocations are generated by the assembler. Section data comprises a plurality of code sequences executable in the final program, and data values to be accessed by the executing program.

In particular a set of "relocations" to enable link time optimisation of code is described. Conventionally a relocation describes the patching of section data or instructions with (encoded versions of) symbols. Such relocations are referred to herein as "bit relocations". In addition a number of so-called "special relocations" are discussed herein which are sometimes referred to in the following as "non-bit" relocations to distinguish from conventional "bit" locations.

Firstly, non-bit relocations are defined that describe the calculation of integer values based on the values of symbols and constants passed to the linker. The integer values in the described embodiment are 32 bits long.

Secondly, relocations are also provided to conditionally include or delete section data, written into the section at the point(s) of possible inclusion, based on those calculations.

One use of the special relocations discussed herein is to introduce an arbitrary set of instruction sequence alternatives into a set of section data. The alternative instruction sequences are written as alternative sequences in a special macro section in the object code modules and a macro call is inserted at the point in the ordinary section wherein one or more of them may be needed. As mentioned above, the object code modules can be user defined or retrieved by the linker 4 from a library 6 as object files containing template code for insertion in the executable program wherever it is needed.

It is assumed that a skilled reader is familiar with the ELF format and so only a very brief description will be given here prior to describing the special relocations.

The ELF (executable and linking format) standard defines a convention for naming relocation sections belonging to a given section. For a section of name .xxx the standard prescribes relocation sections .rel.xxx and .rela.xxx. The structure of these sections is defined and a partial semantic associated with them. Specifically an entry in .rel.xxx has, an offset field—the offset in the .xxx section where the patching is to occur, a symbol field—the symbol whose value is to be patched, and a type field—an otherwise undefined type.

It is the type field that is used to describe the appropriate method of encoding the symbol value into the instruction or data of the .xxx section.

The .rela.xxx section is similarly defined but has an extra field (the addend) with the semantic that the addend is to be added to the symbol value before patching in.

In order to support the special relocations described herein, a new type of relocation section is defined, with the naming convention .relo.xxx which is specifically intended to support optimising at link time. In this way the .rel and .rela sections are left free to be used for conventional bit relocations.

Figure 2:
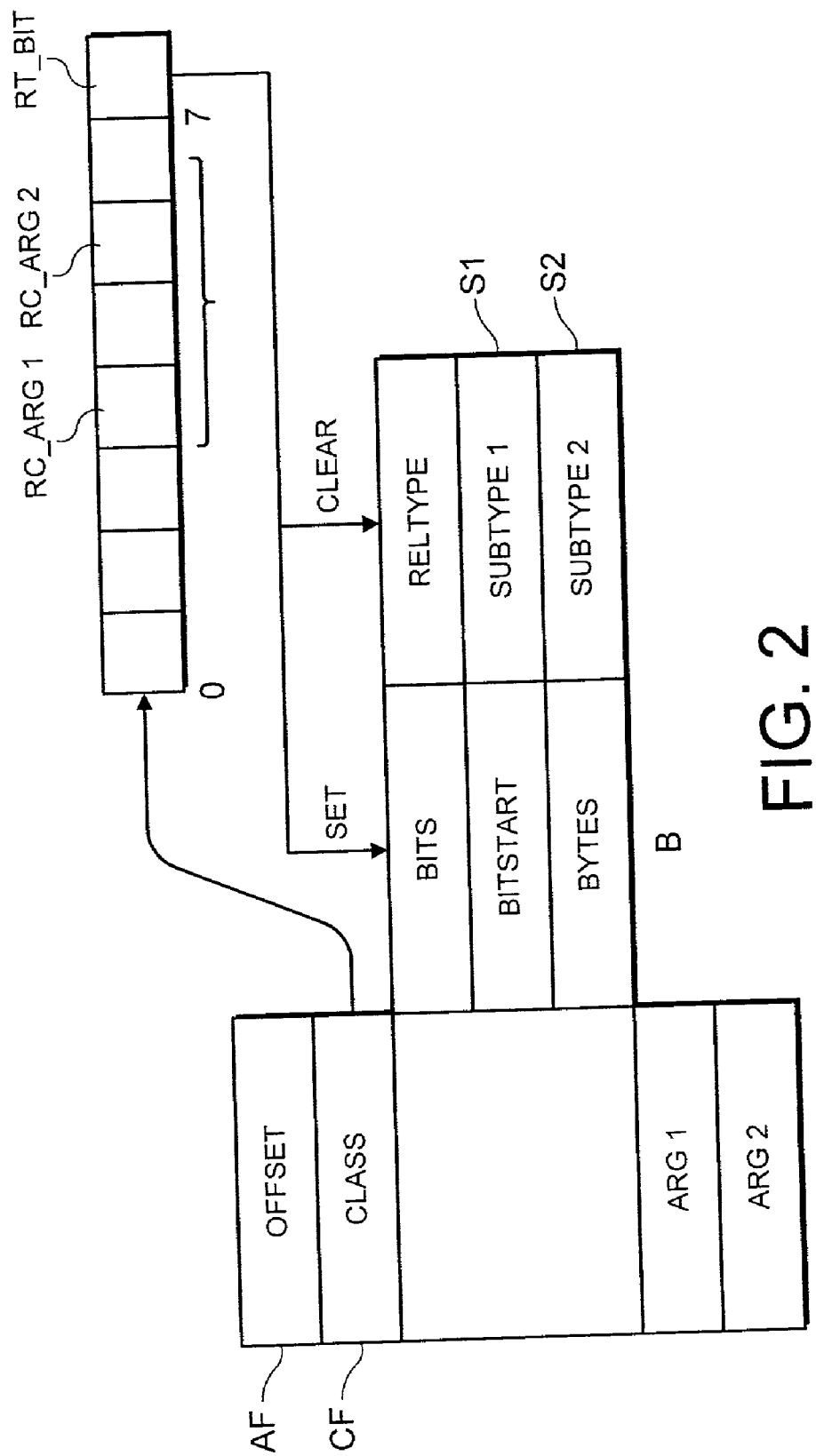
FIG. 2 is a sketch illustrating the layout of the special relocations.

The format of an entry in the .relo section is given in Annexe 1 (it should be read in the context of the 32-bit ELF standard). It is illustrated in FIG. 2.

The underlying structure of the new type has an address field AF (r_offset), a 1 byte classification field CF (r_class), 3 information fields which are labelled reltype, S1, S2 (1 byte each) for non-bit NB relocations and bit, bitstart, bytes for bit (B) relocations, and two one word arguments (r_arg1; r_arg2).

r_offset

The location at which to apply the relocation action. (That is, if this is the .relo.xxx section, then r_offset is the offset in the .xxx section where the relocation applies.)

r_class

The classification byte indicates the type of relocation (bit or non-bit), and also conveys information about the use of the remaining fields.

In the classification byte, bit 7 RT_BIT indicates a bit relocation if set (in which case the B fields apply) or non-bit relocation if clear (in which case the NB fields apply). Bits 3-6 specify whether the r_arg1,2 fields are a symbol index or a value. Table 1 defines how the bits specify the interpretation of the r_arg1,2 fields.

r_arg1,2

The interpretation of these fields depend on bits 3-6 of the r_class field. Two bits RC_ARG1, RC_ARG2 are associated with each of r_arg1 and r_arg2. For bit relocations these two fields are normally used as symbol and addend.

For non-bit relocations the fields r_arg1,2 hold constant data being passed with a non-bit relocation. As with bit relocations bits 6 and 5 say whether they hold a symbol index or a value. The actual use of any symbol or value passed with a non-bit relocation depends on the nonbit.rel-type field. This may be an absolute value representing things such as alignment, register numbers etc. The semantics are given in the table of relocation types in Annexe 2.

The bit (B) type fields:

r.bit.bits

The number of bits that are to be patched. A lower case "b" is used to indicate this quantity in the name of a relocation.

r.bit.bitstart

The least significant bit to be patched. A lower case "s" is used to indicate this quantity in the name of a relocation.

r.bit.bytes

The size of the object being patched. This is needed for big endian targets in order to find which byte the least significant bit is to be found in, and where the higher order bits are. An upper case "B" is used to indicate this quantity in the name of a relocation.

Note that the following notation is used to name the bit relocations:

R_b<val>s<val>B<val> where <val>'s represent the number of bits, start bit and number of bytes as specified by the r-bits, r.bitstart, r.bytes fields. For example R_b16s0B4 will patch the least significant two bytes of a four byte object. This will be the bytes at offsets 0,1 or 4,3 depending on the target endianness.

The non-bit (NB) type fields:

r.nonbit.reltype

This field describes what sort of action the linker must perform. These include such things as executing an operation on the linker's internal stack of values, storing parameters to macros, conditionally deleting section data etc, as described in more detail later.

r.nonbit.subtype1,2 (S1,S2)

These fields hold values whose interpretation depends on the reltype field, and bits 3 to 6 of the classification field.

TABLE 1

| Name | RC_ARG1 | Meaning |
| --- | --- | --- |
| RC_PARAM | 3 | r_arg1 is param |
| RC_VAL | 2 | r-arg1 is value |
| RC_SYM | 1 | r_arg1 is symbol |
| RC_UNUSED | 0 | r_arg1 is unused |

Figure 3:
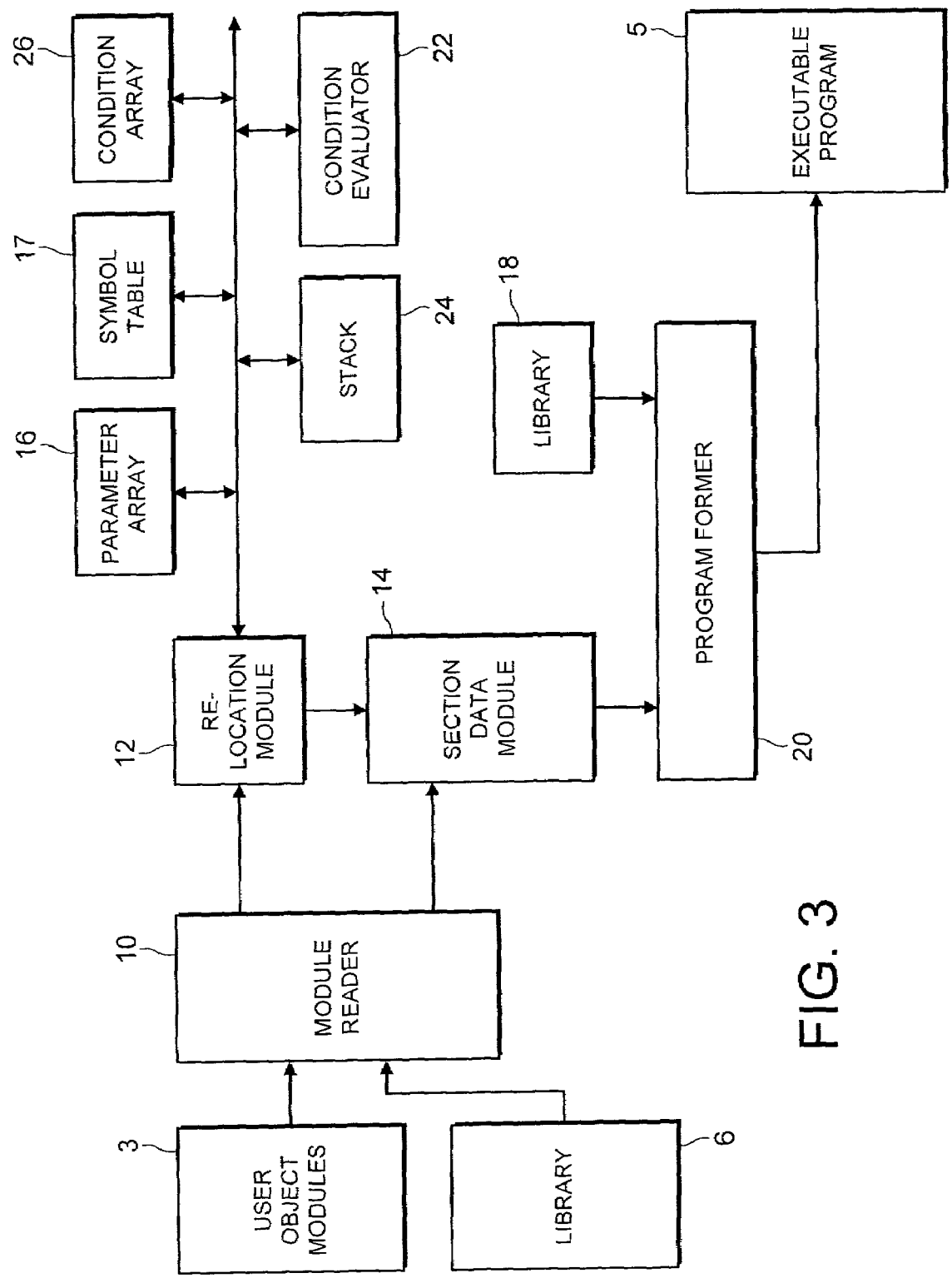
FIG. 3 is a block diagram of a linker.

The above described new type of relocation section supports a number of special relocations which allow a number of different functions to be performed by the linker. FIG. 3 is a block diagram of components of the linker which will be used to describe these additional functions. It will be appreciated that in practice the linker can be constituted by a suitably programmed microprocessor. It will be understood therefore that the schematic blocks shown in FIG. 3 are for the purposes of explaining the functionality of the linker.

The linker comprises a module reader 10 which reads a set of incoming object files as user written code modules and library object files from the library 6. A relocation module 12 reads the relocations in the object code module. A section data module 14 holds section data from the object code module and allows patching to take place in response to relocation instructions in the object code module interpreted by the relocation module 12. The relocation module can also interpret special relocations and apply these to the section data held in the section data module 14. A program former 20 receives sequences from the section data module 14 and/or the library 18 depending on the actions taken by the relocation module 12 and forms the executable program 5 which is output from the linker 4. The linker also includes a condition evaluator 22 which operates in conjunction with a stack-type store 24. The condition evaluator reads the value of the top entry of the stack 24.

The linker also implements three arrays or tables as follows, a parameter array 16, a symbol table 17 and a condition array 26.

Before describing more specifically each of the above new relocations, the basic operation of forming an executable by a linker is summarised below. The basic operation comprises:

1. copying sections from input modules to same-name sections in the output executable, and
2. patching sections following the relocations in their corresponding relocation sections. This includes deleting code sequences from the module (caused by an assembler directive LT_IF, discussed later).

After step 1, all the branches of the LT_IF . . . LT_ENDIF assembler directives are present in the executable, and the linker is only concerned with deleting unwanted sequences.

The action of the linker when carrying out steps 1 and 2 is cyclic, checking through the code of the object code modules time and time again, looking at one relocation at a time. Where a conditional relocation (e.g. R_IF) is executed further relocations may not be executed until the corresponding end conditional (e.g. R_ENDIF), so that whole functions may be skipped, thereby skipping the relocations they contain. Each cycle is termed a "pass" of the code. In each such cycle, each function is categorised as reachable or not, i.e. reachable via function call or the taking of the function's address, by the code which was classed as reachable by the end of the previous loop. The first loop starts with only the entry point to the code defined as reachable—subsequent loops classify more and more code as reachable until the actual extent of the code required to make the final executable program has been established, the "reachable" section of code has stabilised and the process can stop. At this stage the linker has reached its "ready" state, and a "ready" variable is set. The concept of functions being "reachable" and the linker attaining its "ready" state will be used below.

Link Time Calculations

The first special relocation type which will be described allows arbitrary calculations to be passed to the linker by way of a number of special relocations which are defined by the reltype field of the new relocation format ELF32_relo. These relocations are numbered 6-29 in Annexe 2.

The set of the special relocation types listed in Annexe 2 allow the linker to support a general purpose stack based calculator. These relocations allow the value of symbols and constants to be pushed on the stack 24 and a designated manipulation to be performed. With the bits RC_ARG1 in the class field CF set to RC_UNUSED (see Table 1), binary operators act on the top two stack entries. Otherwise, the value passed and the top of stack (tos) entry are used. Unary operators operate on the top of the stack 24 (tos) Both pop their operands and place the result on the top of the stack. The full definition of the relocation types to support this is given in Annexe 2. There follows examples of their use.

Patch Symbol Plus Addend in 16 Bit Target Integer

Figure 4:
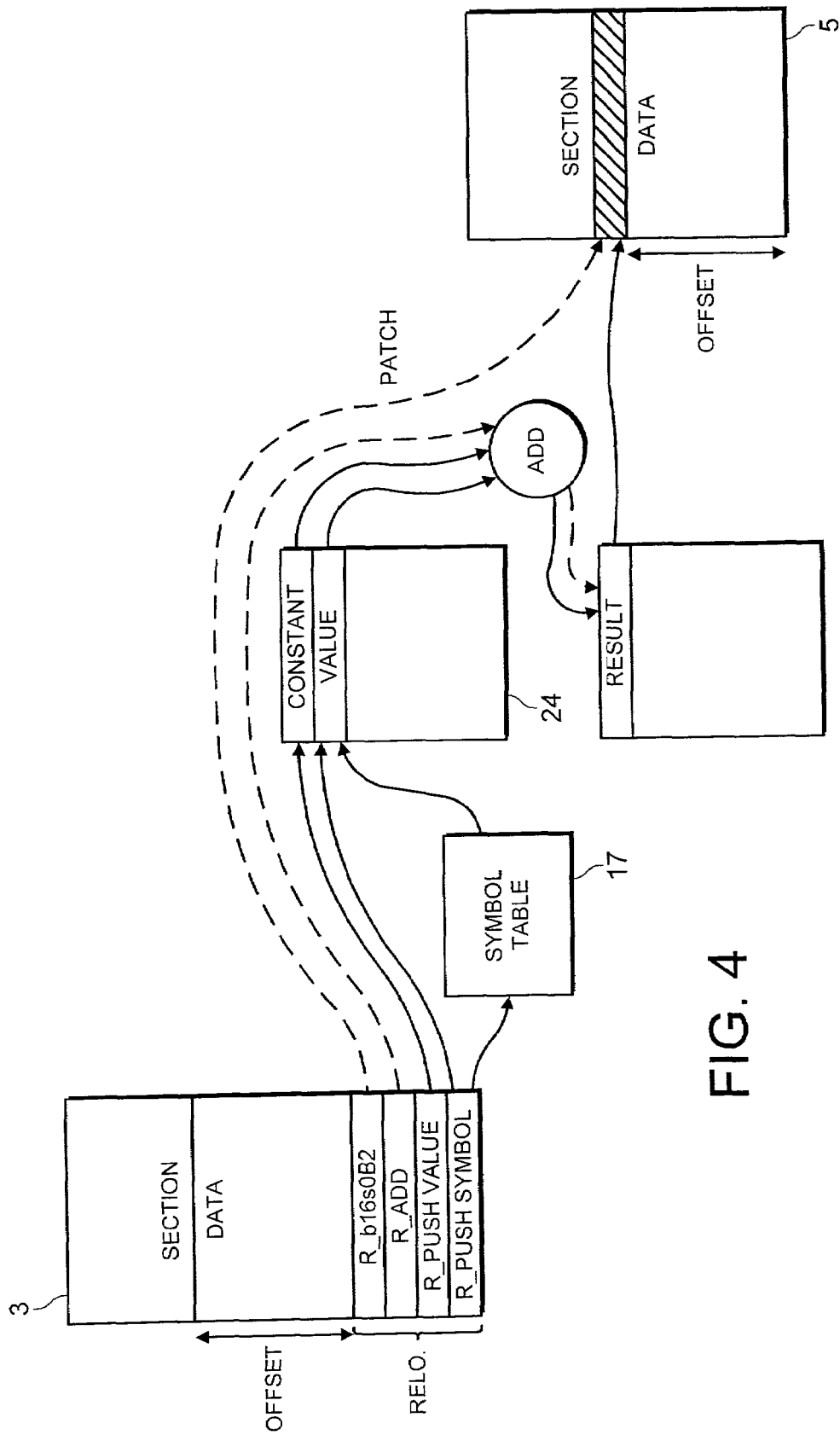
FIG. 4 is a schematic diagram illustrating one example of the use of special relocations to implement calculations.

This could be accomplished by the following ordered sequence of relocations. The effect of the sequence is illustrated schematically in FIG. 4. FIG. 4 illustrates section data and its accompanying set of relocations forming part of an object code module 3. The relocations will be read in order from the bottom in FIG. 4. The listed relocations are:

R_PUSH symbol /* relocation to push value of symbol on stack */
R_PUSH value /* relocation to push constant value on stack */
R_ADD /* pop top two values off stack add them and push result back */
R_b16s0B2 / patch the value popped from the top of stack into the section data, 16 bits are to be patched, starting at bit 0, in target object two byte wide */ all with the same offset (the offset of the integer to be patched in the section). The result of the patch is shown in the section data which forms part of the executable program 5.

The above relocations are implemented as described in the following with reference to FIGS. 3 and 4. The section data and relocations are read by the module reader 10. The section data is applied to the section data module 14 and the relocations are applied to the relocation module 12. The relocation module considers the first relocation, in this case R_PUSH symbol and acts accordingly to read the required value of the identified symbol from the symbol table 17 and push it onto the stack 24. The subsequent relocations are read, and the necessary action taken with respect to the stack as defined above. Finally, the last bit relocation R_b16s0B2 patches the final result value from the stack 24 into the 16 bit target integer. This patched section data is held in a section data module 14 ready for inclusion in the final program at the program former 20 unless, of course, some later relocations make further modifications prior to completion of linking.

As a short-hand any operator can be accompanied by a symbol as one of its operands (the left hand operand in the case of binary operators). In that case the following sequence could be used:

R_PUSH value /* relocation to push value on stack */
R_ADD symbol /* pop top value off stack add the value of the symbol and push back the result */
R_b16s0B4 /* patch section data, 16 bits, starting at bit 0, in target object four bytes wide */

Although the above are given as examples of use of the stack calculator in the linker, the stack calculator is not actually needed for this calculation since both a symbol and a value could be passed in one normal bit relocation. All that is needed in this case is:

R_b16s0B2 symbol value.

Nevertheless the example illustrates how the special relocations support a stack based calculator at the linker.

Referring additionally now to the remaining relocations numbered 30 to 40 in Annexe 2, the top of stack can also be used for conditional linker relocations as described later. For example, to include section bytes if a symbol has more than 8 bits we could use:

R_PUSH symbol
R_PUSH 0xffff_ff00
R_AND (the above relocations all have the address field r_offset set equal to the start of the section bytes to be conditionally included)

R_ENDIF (with the address field r_offset set equal to end of section bytes to be included+1)
(R_ENDIF is discussed later)

The relocation R_PUSH can have a number of different effects. With the bits RC_ARG1 set to RC_SYM (i.e. the r_arg1 field acts as a symbol index), the field s1 holds a value to indicate what part of symbol information is to be pushed on the stack. The value held in the s1 field is indicated in Table 2.

TABLE 2

| Name | Meaning | Value |
| --- | --- | --- |
| SF_NAME | st_name | 1 |
| SF_VALUE | st_value | 2 |
| SF_SIZE | st_size | 3 |
| SF_INFO | st_info | 4 |
| SF_OTHER | st_other | 5 |
| SF_INDEX | st_shndx | 6 |

Different macro parameter types (MPT) can be passed with the R_PUT_PARAM and R_GET_PARAM relocations. They enable type-checking of the macro call parameters, and allow the linker to distinguish symbol indexes from values. MPT_VALUE denotes a constant value and is denoted by value 0 in the s2 field. MPT_SYMBOL denotes a symbol index and is denoted by value 1 in the s2 field.

For a processor having two instruction modes, this artefact can be used to denote the mode of instruction that the symbol labels. Thus, the R_PUSH_ST_OTHER is used to detect at link time if a symbol is mode A or mode B code. The assembler sets s1 to mask off the STO_MODE_A bit in the symbol's st_other field. The linker pushes the bitwise AND of s1 and the st_other field on the internal linker stack. This can be used by the linker conditional relocations to insert the appropriate calling sequences.

Conditional Section Data

Another set of the special relocations allow code sequences to be conditionally included in a final executable program. For now, it is assumed that all the possible alternative sequences are included in the section data of the object code module which the linker is currently examining. It will become clear later, however, that other possibilities exist for the alternative sequences.

A method of conditionally including one sequence out of a number of alternatives in the section data will now be described with reference to FIGS. 3 and 5. The assembler 2 acts on Conditional Assembler directives to generate special relocations which instruct the linker to conditionally delete unwanted section data.

Figure 5:
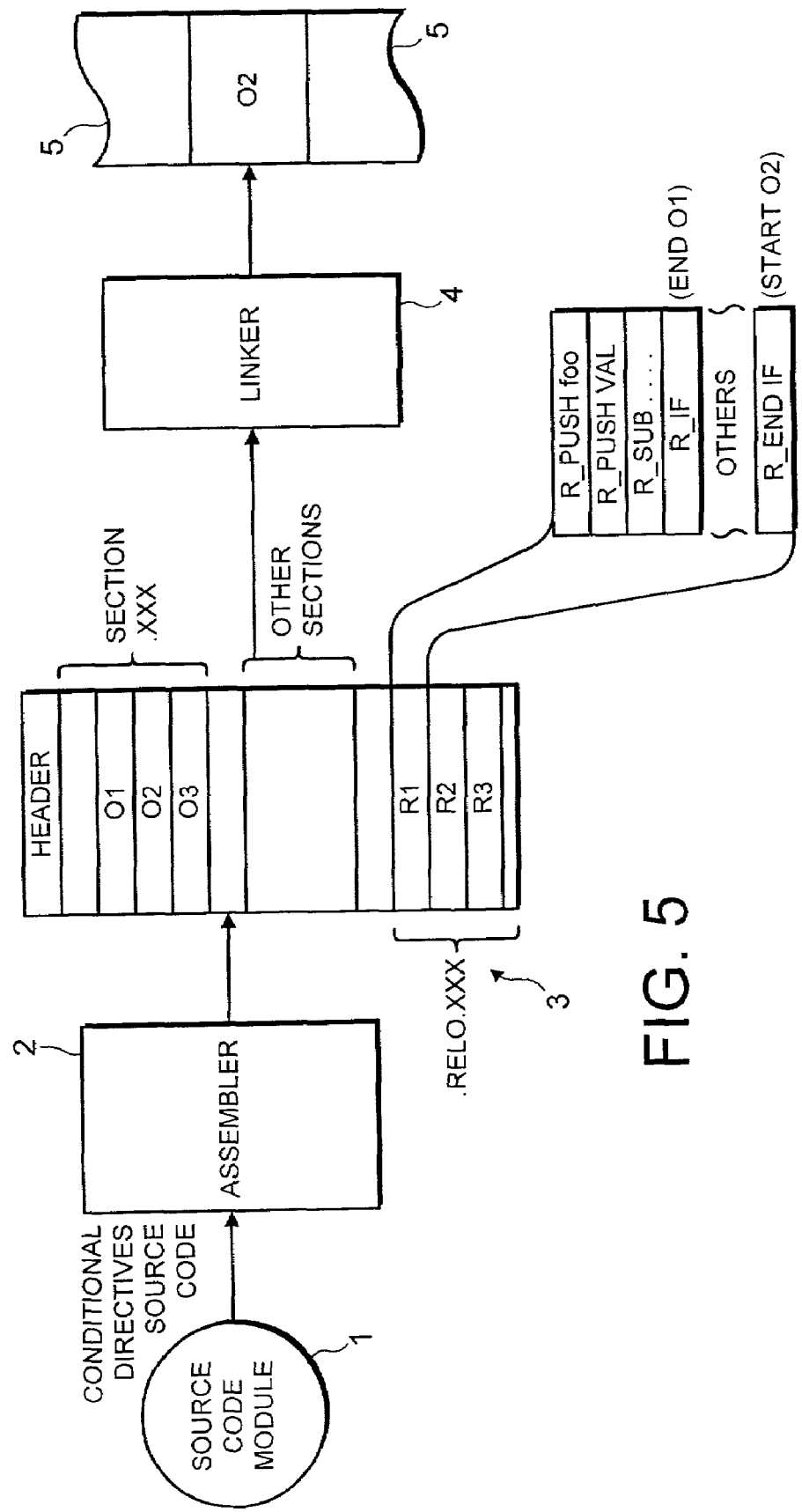
FIG. 5 is a diagram showing the use of special relocations to conditionally insert section data.

FIG. 5 shows how a resulting object module 3 comprises a set of sections, each section comprising a plurality of code sequences O1,O2,O3 each having a relocation section R1,R2,R3 generated by the assembler 2. The section data .xxx is shown in FIG. 5 with its relocations R1,R2,R3 in the relocation section .relo.xxx. The relocation bracket between the R_IF and R_ENDIF relocations denotes the respective offsets defining the code sequences in the section data. An example sequence is illustrated in FIG. 5. The relocation sections are read by the relocation module 12 of the linker 4 to determine how to patch the section data to form a program. According to this embodiment relocation sequences are included in the relocation section associated with each code sequence in the section data to denote that a sequence may be conditionally deleted in the program depending on the top of stack value determined by the previous stack manipulations done by the linker. These relocations compute the conditions to be evaluated, using the symbols or values in the section data.

In FIG. 5, code sequences O1,O2,O3 are alternative sequences for possible deletion in the final module. Thus, the final executable program 5 might include sequence 02 only, sequences O1,O3 having been deleted by the linker because of the relocations R1,R3. In that case, sequence 02 has been "patched" (i.e. not deleted) using relocations in R2.

At link time the relocation module 12 makes multiple passes over the section's relocations recording which conditional passages are included. These are held in the section data module 14 while the condition evaluator 22 evaluates the condition by examining the top of stack. The conditions for inclusion are based on the values of symbols and, since some of these will be forward references to labels in the same section, the result of a given conditional expression may change on the next pass. For this reason multiple passes are required until no more changes are needed.

In order to support the conditional section relocation, a number of new Assembler Directives are required as follows. These cause certain special relocations to be issued as described later:

LT_IF expr

Marks the start of a block of section data to be conditionally deleted. The condition is that expr should evaluate non-zero. The assembler issues the stack manipulation relocation 6-29 in Annexe 2 to push expr on the linker stack 24 and an R_IF relocation.

LT_ELSE

Marks the start of block of section data to be conditionally inserted/deleted. The condition is the previous LT_IF at the same level of nesting evaluated as zero. The assembler issues an R_ELSE relocation.

LT_CONDITION condition_name expr

The assembler issues the relocations to calculate the expr (that is, expr is pushed on top of the stack). If condition_name has already appeared in an LT_CONDITION directive then the index associated with it is re-used. Otherwise the next unused index is chosen (initially 0). The assembler then issues R_STORE with that index. In this way, the condition array 26 can be constructed. After the condition_name has been associated with an index in this way it can be used in an expression in place of a constant or symbol. When used, the assembler issues R_FETCH with the index associated with condition_name. That index is used to address the condition array 26. The scope of condition_name is the section where the LT_CONDITION directive occurs, from its point of first occurrence.

LT_ENDIF

Marks where normal linker processing re-starts after an LT_IF/LT_ELSE/LT_IF_FIXED (described later) directive. The assembler issues an R_ENDIF relocation.

The following are the special relocations used to support conditional section data deletions, which are issued by the assembler responsive to the conditional Assembler Directives.

R_IF

Causes the top entry to be popped from the linker's stack of values. If the value is zero then section data is skipped and the succeeding relocations are ignored until R_ELSE/ R_ENDIF is encountered. If the value is non-zero then relocations are processed and instructions are not deleted until R_ELSE/R_ENDIF is encountered.

R_ENDIF

Defines the end of the relocations subject to the R_IF relocation, and of section data to be conditionally deleted subject to the R_IF relocation.

R_ELSE

If this is encountered while section data is being taken then section data is skipped and the succeeding relocations are ignored until R_ENDIF is encountered. If encountered while skipping due to R_IF then relocations are processed and instructions are no longer deleted until R_ENDIF is encountered.

R_STORE index

A value is popped from the linker's stack of values. It is put in the condition array 26 kept by the linker for this purpose. The value is stored at the index passed with the relocation (in the nonbit.subtype field). This relocation avoids the overhead of passing the same calculation to the linker many times over.

R_FETCH index

A value is pushed on the linker's stack of values. The value pushed is the value in the condition array 26 at the index passed with the relocation.

Having described some special Assembler Directives and corresponding relocations generated for conditional inclusion of section data, a more specific use of these will now be described.

In particular, the embodiment supports conditional inclusion of particular functions. This is important because there are likely to be functions in the object code modules 3, for example standard coded functions, which are not actually called in the final executable program 5. Clearly it is inefficient to have un-used functions in the executable code.

In order to prevent occurrence of un-used functions, conditions are used which depend not on the value of a symbol, but instead on the value of a Boolean associated with the symbol. To this end, each symbol has an attribute attached to it, which is a Boolean called REACHABLE. The status of the attribute REACHABLE is set during linking as described in the following. The value of this Boolean determines whether or not a particular function is "reachable" i.e. whether it is called. This attribute is referenced by a relocation instruction R_ATTRIB.

The embodiment works by initially deeming all functions to be unreachable, which means that the value of the attribute REACHABLE is initially set to 0. It will be seen below that a function is only marked as "reachable" when a reference to it is detected. The exception to this is the entry point to the object code module, which is initially marked as reachable at the start of the first pass of the linker.

The embodiment is implemented as an algorithm written by the compiler 2 in linker control language (LCL). The basic idea is for an R_ATTACH_ATTRIB relocation to be written in order to attach the REACHABLE attribute to all the symbols in each object code module, the attribute having an initial value of 0. Thus the function of the R_ATTRIB relocation in this situation is to attach the REACHABLE attribute.

The process occurs within an initialisation module for the program. Wherever in the LCL for a symbol the compiler writes an R_ATTRIB SF_VALUE AT_READ relocation instruction defining an entry point of the program it additionally writes an R_ATTRIB relocation instruction to set the REACHABLE attribute to 1.

The other function of the compiler is to bracket all the functions by an R_IF . . . R_ENDIF loop.

Figure 8:
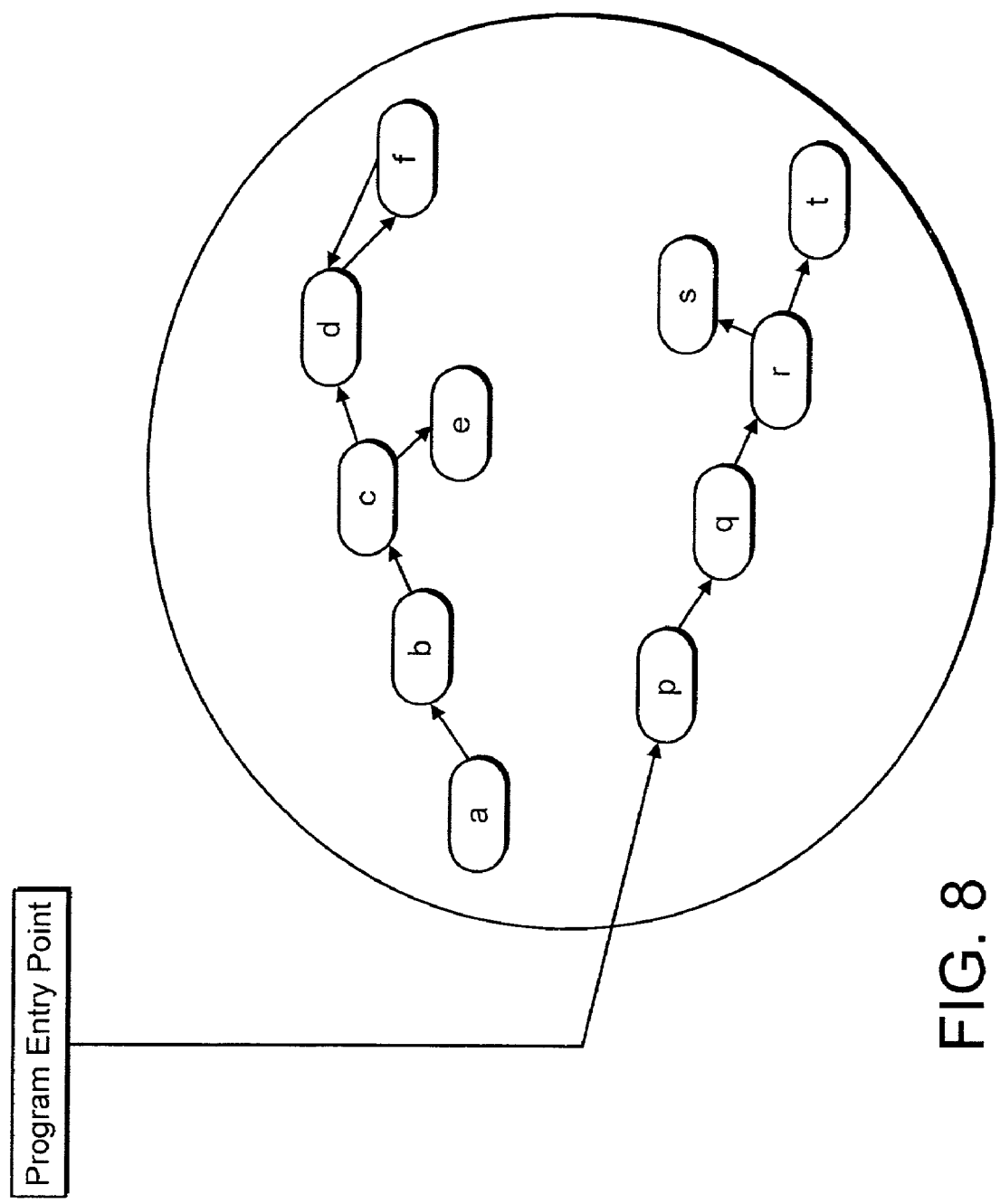
FIG. 8 is a diagram showing functions being processed by a linker.

FIG. 8 shows a circle which represents all the object code modules 3 which have been passed to the linker. There is also a rectangle which represents an instruction as to the entry point of the program. The entry point instruction is an LCL relocation r_ATTRIB SF_VALUE AT_READ, as described in the previous paragraph, and is given to module reader 12 of the linker. The object code modules 3 are not shown in the figure, but they can be thought of as groupings of functions (a module may not have any functions in it). Blocks of code for functions are shown by the lozenge shapes a-f, p-t. The arrows indicate that one function calls another, for example, the arrow from lozenge p to lozenge q indicates that function p calls function q. In other words, the code of function p contains an instruction that is acted on by a relocation to patch the value of the entry point symbol of function q.

On the first pass of the linker, only function p has its REACHABLE attribute set to 1, because function p is the entry point to the program, as mentioned above. The LCL of function p is executed so that its section data is included in the final executable program 5. At the point where function p calls function q, the value of q is patched into the data of the function p. The compiler has issued an R_ATTRIB relocation instruction for q, so that due to its being called by function p its REACHABLE attribute is set to 1. Thus on the second pass, the REACHABLE attribute of function q has been set, it is therefore declared reachable, and its relocations are traversed and its section data is included in the final executable program 5.

In a similar way, since function q calls function r, the REACHABLE attribute of function r is set to 1 so that on the third pass, r is declared reachable and its section data is included in the final executable program 5. Functions s and t are also included by virtue of their being called by function r.

However, none of the functions a-f are ever called by any of the functions p-t and are therefore not included in the final executable. In other words, the functions a-f are not called by any functions which can be reached from an entry point of the program.

Figure 9:
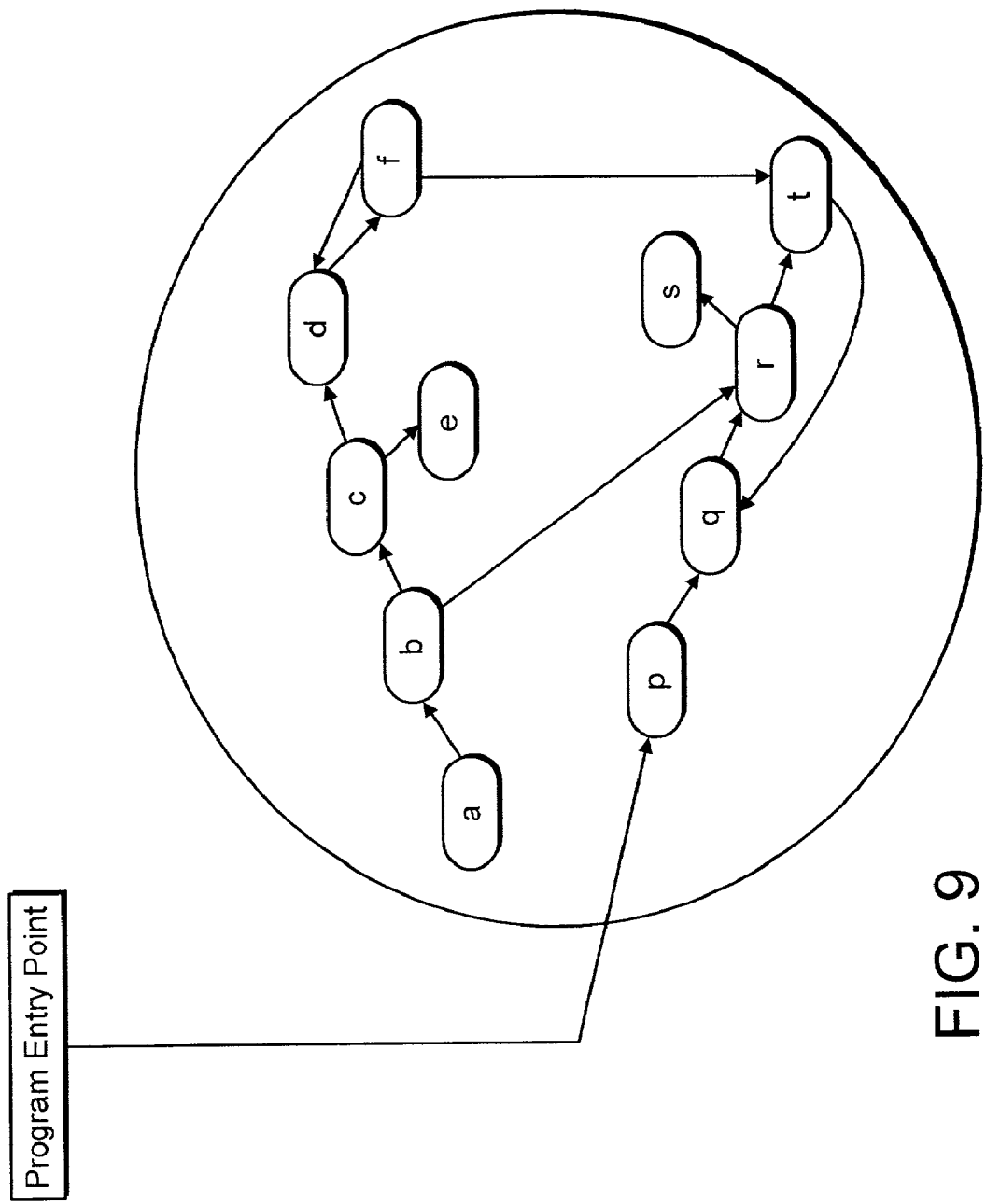
FIG. 9 is a diagram showing a more complicated arrangement of functions being processed by a linker.

The same principle can be applied to a more complicated function set, as shown in FIG. 9. FIG. 9 shows a similar function set to FIG. 8 but the connections between the functions are slightly more complicated. Although functions q and t are called by functions in the a-f group, none of the functions in the a-f group are called by any of the functions in the p-t group. Therefore none of their REACHABLE attributes are ever set to 1 and they are not included in the final executable program.

In practical terms within the linker, the above process is implemented by the compiler using the special relocations R_IF and R_ENDIF to bracket all the functions. As described above, R_IF causes the top entry to be popped from the stack 24. Thus R_IF is set to test the REACHABLE attribute. On successive passes of the linker the top entry is popped from the stack in order to read symbols' REACHABLE attribute and thus classify each as either reachable or not reachable. By this process more and more code (bracketed by LT_IF REACHABLE(function_name). . . LT_ENDIF) is included, until all the functions that can be reached from the entry point(s) have the REACHABLE attribute of their respective symbols set to 1 and hence are being traversed by the linker's relocation module 12. Reachable status of each function is passed onto section data module 14 which either includes or does not include the function in the final executable program 5, in dependence on its reachable status.

Figure 6:
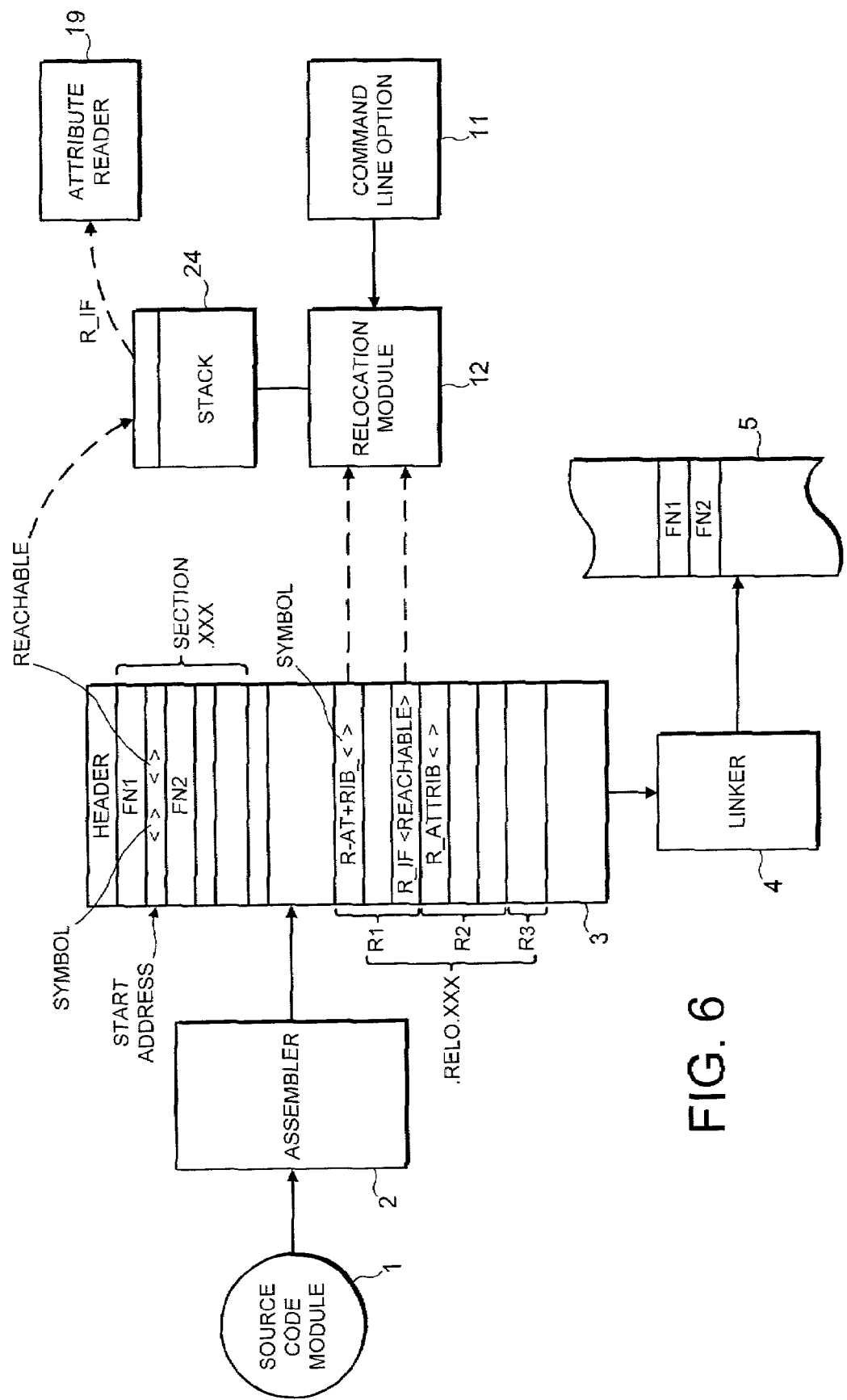
FIG. 6 is a diagram showing a particular use of special relocations to avoid including un-called functions in an executable program.

The above-described process is shown diagrammatically in FIG. 6. This figure shows an object code module 3 to comprise a set of section data containing one or more functions FN1, FN2 etc. Each function has associated with it a symbol which has the REACHABLE attribute attached to it. Each function has a relocation section R1, R2 etc. associated with it. One set of section data comprising two functions is shown but in practice there would be more than two functions and more than one set of section data. There would also be more than one object code module. The section data is labelled as section.xxx and the relocations are labelled as relo.xxx, as per the convention explained previously. Each relocation section is shown to include the relocation instruction R_ATTRIB and to use the relocation instruction R_IF to read the value of the REACHABLE attributes.

The relocation sections are read by the relocation module 12 of the linker 4 in accordance with the entry point(s) of the program identified by command line option 11. The command line option 11 defines the entry point to the program in one of two ways, as described above. The module 12 starts at the start address indicated. When the R_IF relocation instruction is encountered in R1, the top entry is popped from the stack 24 and the REACHABLE attribute of FN1 is read by attribute reader 19. All functions which are reachable from the start address will have their REACHABLE attributes set to 1 in subsequent passes of the linker. At each pass, the attribute attached to a different value is read and the value is passed onto section data module 14, which produces executable program 5. Since both functions FN1, FN2 are reachable they appear in executable program 5.

Due to the use of the special relocations, re-coding is not required for different architectures. Furthermore, mutually recursive functions (e.g. function d calling function f, function f calling function d but neither being called by any other function, as shown in FIG. 8) will never be traversed since they are not called from a reachable function. Therefore they will be omitted from the final executable.

A related use of a Boolean in special relocations is for dealing with functions which have full and reduced versions, the full versions having additional code over and above that of the reduced versions. An example of this is two types of function in the C runtime library—the printf type and the scanf type. printf deals with text output and scanf is an equivalent function dealing with text input. Each of these functions is in fact part of a family. Printf itself prints only to stdout (usually the monitor). The related family members are: fprintf which can print to files, sprintf whose output is put into another string variable within the program, and wprintf, fwprintf and swprintf which do the same but with support for extended character sets. There is an analogous family of input functions known as scanf, fscanf, sscanf, wscanf, fwscanf and swscanf.

The following example deals with the printf situation, but the scanf situation is analogous. Each of the printf family is built on a large, complex function known as doprnt. The actual printf functions which call this are very small in comparison to doprnt. Doprnt's job is to take the encoded input which printf has received, and transform it into a simple stream of characters. Most of the complexity of this job is due to the difficulty in processing floating point (fp) numbers, which are any numbers that are not integers, for example decimal fractions and "standard form" numbers.

The full versions of doprnt and printf etc. are only required if floating-point numbers need to be processed, otherwise the reduced version is sufficient.

Many programs do not output floating-point numbers and therefore do not need the additional code in the full version. This code requires significant memory space, so it is advantageous not to include it if it is not needed. Therefore if no call to a "printf" outputs floating-point numbers, the smaller, (non-floating-point) reduced version should be called by each call to a "printf" function. However, it must be remembered that if any file anywhere in the final executable program being generated requires the full doprnt, the full version should be called even for calls to the printf function which do not output floating-point numbers. This is because it is more efficient to only include one version of doprnt in any given executable.

The first stage of the process of the embodiment for dealing with the above-mentioned situation takes place in each compiler 2, wherein each call to one of the six family members of the printf function listed above in the source code module 1 is scanned at compile time to determine whether its arguments specify floating-point output or not. If none of them does, the call is transformed at this point for production of the object code module 3 to a call to an equivalent function which calls the reduced version of doprnt. However, this is not sufficient as a complete solution because each compiler run is only generating one object code module and is therefore not able to see a full picture of all code in all the object code modules and hence is unable to determine systematically whether all files in the whole executable program to be generated will require the full version at any point. Thus this step is unable to complete the process of avoiding including both versions of printf in the final executable program to be generated.

Therefore the embodiment uses the linker 4 because it is the only part of the core toolset to see information from all modules forming the final executable i.e. all object code modules 3. If information was simply taken in turn from each object code module, it could happen that a function calling the reduced non-fp doprnt version becomes "reachable", in which case the reduced version would be included in the final executable. However, if later in, say, a subsequent object code module a function calling the full fp doprnt also becomes "reachable", doprnt code which is required in the reduced version but not in the full version, will already be reachable but will not necessarily be needed. At this stage it would not be practical to remove it, because it might be needed by functions elsewhere, which means it is not acceptable to remove unnecessary code when it is already reachable.

Therefore the embodiment works by not ever considering the non-fp doprnt to be reachable, until it has been established whether or not full doprnts are required by the code. This is established for the entire executable when the full doprnt is first considered reachable by the linker (as opposed to any of the compilers) or when the linker has reached its "ready" (i.e. stopped looping) state, whichever is attained first.

Thus the linker's logic i.e. its LCL is used to record and react to uses of "full" versions and of "reduced" versions of a given function, doprnt being used as the example. There is a section of the LCL code which affects linker behaviour at the start of each loop. It stores information about whether each type of the doprnt function has been seen and monitors and manipulates the linker's "ready" state, which, as discussed above, is a variable which the linker sets when the "reachable" states across the code appear to have stabilised and which, if set, will stop the linker from looping again.

The code to apply this to doprnt is seen in pseudo-code representation below, with comments bracketed < >. The library source code in which the doprnt function originates will, as part of the process of the embodiment, have been modified to contain two versions of doprnt—the full version called _xdoprnt, and the reduced equivalent, called _nofp_ doprnt. It should be noted that this code also makes use of the assembler directives LT_IF and LT_ENDIF, which were used when dealing with un-used functions as described above, for assessing the value of the Boolean REACHABLE. The notation REACHABLE(fn_name) is used to mean the REACHABLE attribute of the symbol fn_name.

```
<Set up variables:>
trust_fp_flag=0
found_fp=0 < if this Boolean is set, _xdoprnt( ) is reachable. Initially
    FALSE but may become TRUE, at which point the value can
    be trusted (i.e. it will not revert). It can also be trusted
    if it is still FALSE when the READY pass is reached.>
found_non_fp=0 < Similarly, if this Boolean is set, _nofp _doprnt ( ) is
reachable.>
< --- --- < --- --- < --- --- < --- --- >
In Icl_init_pass:
LT_IF REACHABLE (_xdoprnt) && (found_fp= =0)
< If this condition is true, it means that _xdoprnt has just been found in
this loop >
    found_fp=1           < record that fp printf has been used >
    trust_fp_flag=1      < use of _xdoprint is definitely known>
    val (_nofp_doprnt) = val (xdoprnt)    < this changes the value
of the linker symbol _nofp _doprnt, so that all calls to this function
actually call _xdoprnt) >
    LT_IF (READY= =TRUE)
        READY=FALSE      < _nofp _doprnt has just been changed
so the reachable set of code may become different, therefore the linker
needs to be told to restart looping >
    LT_ENDIF
LT_ENDIF
LT_IF REACHABLE (_nofp _doprnt)
    found_non_fp =1
LT_ENDIF
LT_IF (trust_fp_flag= =0) && (READY= =TRUE)
< if this is true, it means the linker finished looping once without finding
_xdoprnt >
    trust_fp_flag=1      < record that there are definitely no xdoprnt >
    LT_IF (found_non_fp= =1)
    < If this is true, there are some _nofp _doprnt, so we start the linker
looping again to see what code this makes reachable >
        READY=FALSE
    LT_ENDIF
LT_ENDIF
    < --- --- < --- --- < --- --- < --- --- >
< In nofp_doprnt.s, a file where normally there would just be the
code which makes up the _nofp _doprnt function: >
LT_IF (found_fp= =0) && (trust_fp_flag)
< If this is true, the linker's looping has been restarted, after having
established that there are no _xdoprnt's. The above is the condition
which stops _nofp _doprnt from making code seem reachable,
which may later become not-reachable, by virtue of the _nofp
_doprnt's being converted to _xdoprnt's if an _xdoprnt is found >
    :                    :
    < Here, include function _noft _doprnt ( ) >
    :                    :
LT_ENDIF
```

Figure 7:
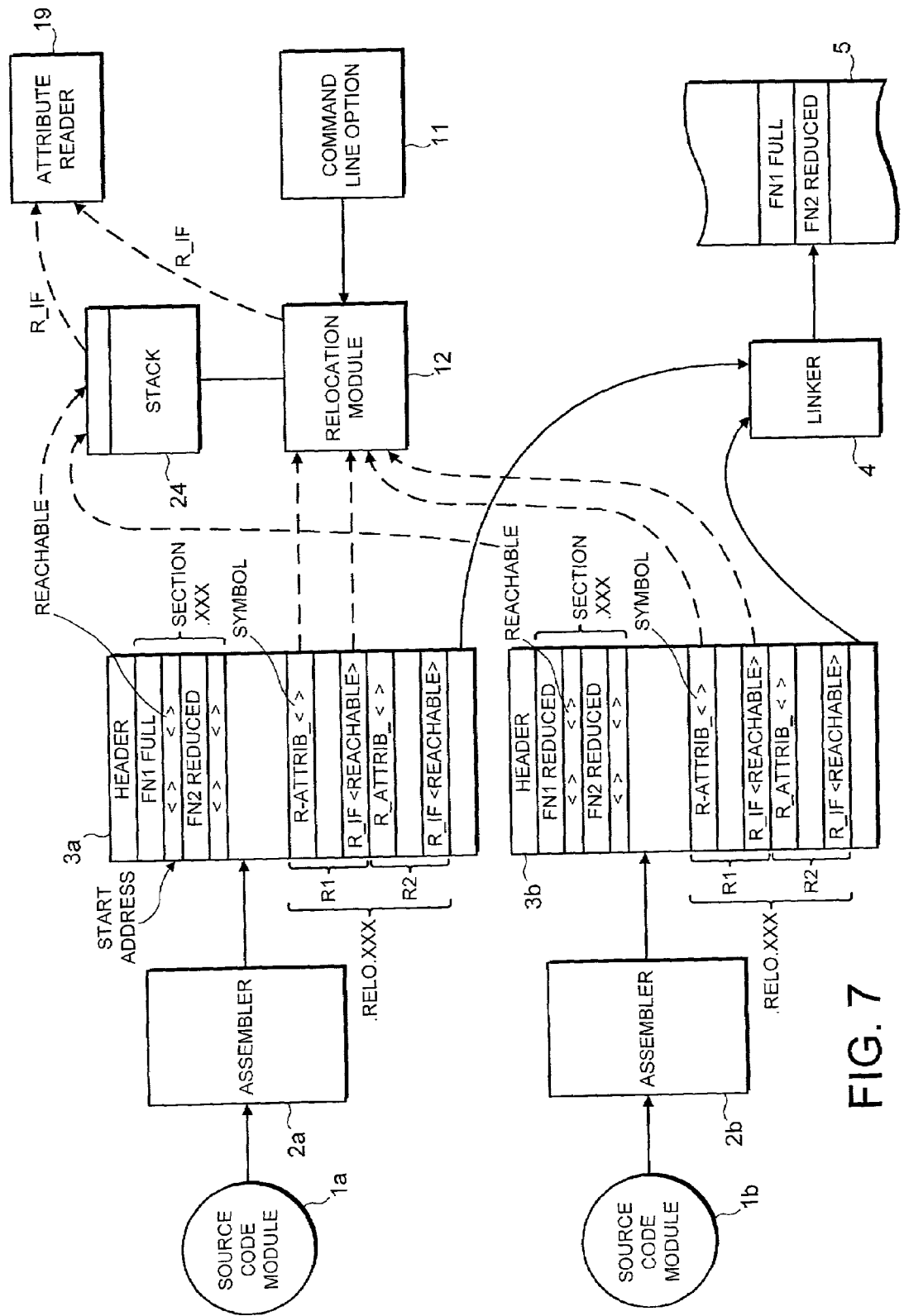
FIG. 7 is a diagram showing a particular use of special relocations with processing functions having a full and reduced version.

FIG. 7 shows the above-described process diagrammatically. This figure is similar to FIG. 6 but it shows two object code modules 3a, 3b each comprising a set of section data containing one or more functions FN1, FN2 etc. Each function appears either as a full or reduced version. For example, in object code module 3a, FN1 is shown to be a full version of FN1 and FN2 is shown to be a reduced version of FN2. Each function has associated with it a symbol which has the REACHABLE attribute attached to it. Each function has a relocation section R1, R2 etc. associated with it. One set of section data comprising two functions is shown but in practice there would be more than two functions and more than one set of section data. There may also be more than two object code modules. The section data is labelled as section.xxx and the relocations are labelled as relo.xxx, as per the convention explained previously. Each relocation section is shown to include the relocation instruction R_ATTRIB and to use the relocation instruction R_IF to read the value of the REACHABLE attribute pushed on the stack by the preceding R_ATTRIB relocation.

The relocation sections are read by the relocation module 12 of the linker 4 in a sequence starting from the modules placed at the lowest memory addresses (the entry point may be at any point in any of the modules), as explained with reference to FIG. 6. In this case, the module 12 starts at the start address indicated in object code module 3a and, after reading object code module 3a will subsequently move onto lowest address in object code module 3b. When the R_ATTRIB relocation instruction is encountered in R1 the REACHABLE attribute of FN1 FULL is pushed on the stack. When the R_IF relocation instruction is encountered in R1, the top entry is popped from the stack 24 and so the REACHABLE attribute of FN1 FULL is read by attribute reader 19. Also, the compiler has inserted relocations to set the trust flag for FN1 to 1. Providing FN2 reduced is reachable from the start address, at a subsequent pass, its REACHABLE attribute will be set to 1. As before, the results of the values of the REACHABLE attributes are passed onto section data module 14 for selective inclusion of full or reduced versions of functions in the final executable program 5 in dependence on the value of their attributes.

When object code module 3b is read and the R_IF relocation instruction is encountered in R1, the top entry is popped from the stack 24 and the REACHABLE attribute of FN1 REDUCED is read. However, since the trust flag is already set to 1 FN1 REDUCED is not included in the executable program 5. At a subsequent pass, even if FN2 reduced becomes reachable, its REACHABLE attribute is seen by the attribute reader 19 to be already set to 1 and is already to be included in the final executable program 1. However, the trust flag for FN2 is never set to 1 since the full version of FN2 is not encountered.

Since the full version of functions FN1 is reachable in object code module 3a it appears in executable program 5 even though the reduced version is also reachable in object code module 3b. Since only the reduced version of FN2 is ever reachable, only the reduced version appears in executable program 5.

It will be understood that whilst doprnt is used as an example, the above LCL code can be emitted by the compiler for all functions which have full and reduced versions. Thus they are all dealt with in this manner during the linking process so that only one of the two versions appears in the final executable. The method is applicable to plural object code modules regardless of how many times each version of a function appears in them.

Annexe 1

```
typedef struct {
    Elf32_Addr r_offset;
    unsigned char r_class;
    union {
```

-continued

```
        struct {
            unsigned char bits;
            unsigned char bitstart;
            unsigned char bytes;
        } bit;
        struct {
            unsigned char reltype;
            unsigned char subtype1;
            unsigned char subtype2;
        } nonbit;
    } r;
    Elf32_Word r_arg1;
    ELF32_Word r_arg2;
} Elf32_Relo;
```

Annexe 2

| Relocation Type Name | reltyp | Meaning (C syntax is assumed) |
|---|---|---|
| R_NONE | 1 | No action is performed. |
| R_NOOPTIMISE | 2 | Optimisation will be turned off from r_offset |
| R_OPTIMISE | 3 | Optimisation will be turned on from r_offset |
| R_PROC | 4 | Marks start of PROC. One marker byte is inserted at r_offset |
| R_ENDPROC | 5 | Marks end of PROC |
| R_MAX (signed) | 6 | tos=(arg1>arg2?arg1:arg2) |
| R_OR | 7 | tos=(arg1\|arg2) |
| R_XOR | 8 | tos=(arg1^arg2) |
| R_AND | 9 | tos=(arg1&arg2) |
| R_EQ | 10 | tos=(arg1==arg2) |
| R_NE | 11 | tos=(arg1!=arg2) |
| R_GT | 12 | tos=(arg1>arg2) |
| R_GE | 13 | tos=(arg1>=arg2) |
| R_LT | 14 | tos=(arg1<arg2) |
| R_LE | 15 | tos=(arg1<=arg2) |
| R_SHR | 16 | tos=(arg1>>arg2) note: arithmetic shift |
| R_SHL | 17 | tos=(arg1<<arg2) |
| R_ADD | 18 | tos=(arg1+arg2) |
| R_SUB | 19 | tos=(arg1-arg2) |
| R_MUL | 20 | tos=(arg1*arg2) |
| R_DIV | 21 | tos=(arg2/arg2) note: undefined if arg2==0 |
| R_REM | 22 | tos=(arg1%arg2) note: undefined if arg2==0 |
| R_PC | 23 | tos<-P |
| R_NEG | 24 | tos=-tos |
| R_INV | 25 | tos=~tos |
| R_REL | 26 | tos<-O |
| R_SIZE | 27 | tos<-Sz section size |
| R_PUSH | 28 | tos<- symbol attribute or value. s1 holds flag saying which symbol attribute/value to be pushed. |
| R_DUP | 29 | tos<-tos (duplicates the top of stack) |
| R_IF | 30 | if (!tos) section data is skipped |
| R_IF_FIXED | 31 | Worst case branch (only for .macro). |
| R_ELSE | 32 | see R_IF (not supported in .macro). |
| R_ENDIF | 33 | see R_IF |
| R_START_MACRO | 34 | Informational, for error checking. |
| R_EXIT_MACRO | 35 | Linker stops inserting section data at r_offset |

-continued

| Relocation Type Name | reltyp | Meaning (C syntax is assumed) |
|---|---|---|
| R_PUT_PARAM | 36 | s1 holds index, s2 holds type information; the linker associates r_arg with these |
| R_GET_PARAM | 37 | s1 holds index, s2 holds type information; the linker retrieves the value associated with these |
| R_STORE | 38 | s1 holds index; the linker associates the value r_arg with the index for retrieval via R_FETCH |
| R_FETCH | 39 | s1 holds index; the linker retrieves the value associated with the index |
| R_MACRO_CALL | 40 | r_arg 1 is a symbol in .macro section whence to insert section data. One marker byte is present at r_offset. |

Key
s1, s2 Mean the r.nonbit.subtype1, 2 field of the relocation.
S Means the sum of r_arg1 and r_arg2 after interpreting them as symbol values or constant values according to RC_ARG1/2.
So The value of symbol's st_other field.
O Means the offset, relative to the base of the containing section, of the relocation entry symbol.
P The absolute address of the relocation entry, r_offset (i.e. the PC).
Sz Means the size of the relocation entry symbol's defining section.
tos Top-of-stack, the value at the top of the internal linker stack.
tos <- Pushes a 32-bit signed value onto the internal linker stack.
tos=arg1 op arg 2 If both RC_ARG1 and RC_ARG2 are RC_UNUSED then both the arguments are assumed to be on the stack (with arg1 pushed first). Otherwise arg1 is S (i.e. the symbol value + addend) and arg2 is tos. The argument(s) on the stack are popped and the operation indicated as op is performed. Finally the result is pushed on the stack.

What is claimed is:

1. A method of linking a plurality of object code modules to form an executable program, the method comprising the steps of:

assigning an attribute to a function from a plurality of functions associated with relocation instructions, wherein the plurality of functions is specified by section data included in at least one of the object code modules and the relocation instructions are specified by a non-bit relocation section included in the at least one object code module, and wherein said attribute is capable of providing an indication of whether the function is reachable;

for the function, ascertaining whether the function is called based on the section data and the relocation instructions of the at least one object code module and, for the function, setting the attribute to indicate a called status as reachable if the function is called; and linking the object code modules using the relocation instructions to prepare the executable program, including the step of reading the attributes of the functions, to only include functions with an indicated called status of reachable.

2. A method according to claim 1, wherein a function from the plurality of functions has a full version and a reduced version and the attribute is capable of providing an indication of whether the full version is reachable and, if the full version is reachable, the executable program is prepared to only include the full version.

3. A method according to claim 2, wherein the attribute is further capable of providing an indication of whether the reduced version is reachable and, after the step of setting the attribute to indicate the called status of the reduced version of the function, carrying out the further step of reading the section data and the relocation instructions again to ascertain if the full version of the function is called and, if the full version is called, setting the attribute to indicate the called status of the full version.

4. A method according to claim 3, wherein, if the called status of the full version is not reachable, including only the reduced version in the executable program.

5. A method according to claim 4, wherein, if the full version is reachable, a trust attribute for the function is set to 1 and, if the said trust attribute is set to 1, only the full version is included in the executable program, whether or not the called status of the reduced version becomes reachable before or after the trust attribute is set to 1.

6. A method according to claim 2, wherein a full version of the function is used for acting on values including floating point numbers and a reduced version of the function is used for acting on values not including floating point numbers.

7. A method according to claim 1, wherein the step of reading the section data and the relocation instructions is carried out a number of times until the attributes for all functions from the plurality of functions have been set and all occurrences of the functions have been read.

8. A method according to claim 1, wherein the attribute is assigned to a function from the plurality of functions by means of a relocation instruction which is capable of attaching an attribute to a symbol.

9. A computing device programmed to implement a linker for preparing an executable program from a plurality of object code modules, the linker comprising:

an attribute assigning module to assign an attribute to a function from a plurality of functions associated with relocation instructions, wherein the plurality of functions is specified by section data included in at least one of the object code modules and the relocation instructions are specified by a non-bit relocation section included in the at least one object code module, wherein at least one function of the plurality of functions is called in the executable program, and wherein said attribute is capable of providing an indication of whether the function is reachable;

a section data holding module to hold the section data which is subject to said relocation instructions;

a relocation module to ascertain, for the function, whether the function is called based on said section data and said relocation instructions of the at least one object code module and, for the function, to set the attribute to indicate a called status; and a program forming module to prepare the executable program to only include functions with an indicated called status of reachable.

10. A computer program product comprising at least one computer-readable medium encoded with computer-readable instructions, the instructions defining an object code module which contains sets of section data specifying a plurality of functions associated with relocation instructions specified by a non-bit relocation section included in the object code module, at least some functions from the plurality of functions are called in an executable program, wherein the computer program product is operative to cooperate with a linker to assign an attribute to a function from the plurality of functions, to ascertain, for the function, whether the function is called based at least in part on at least one of the relocation instructions and to set the attribute to 1 if the function to which the attribute is assigned is reachable, in order to determine one or wore functions from the plurality of functions to be included in a final executable program formed by the linker.

11. The computing device of claim 9, wherein:
at least one of the functions has a full version and a reduced version and the attribute for the at least one function is capable of providing an indication of whether the full version is reachable; and
the program forming module is operative to include only the full version of the at least one function if the full version is reachable.

12. The computing device of claim 11, wherein the attribute of the at least one function is further capable of providing an indication of whether the reduced version of the at least one function is reachable, and wherein the relocation module is operative to read the section data and the relocation instructions again to ascertain if the full version of the at least one function is called, and to set the attribute to indicate the called status of the full version if the full version is called.

13. The computing device of claim 12, wherein the program forming module is operative to include only the reduced version of the at least one function in the executable program if the called status of the full version is not reachable.

14. The computing device of claim 13, wherein the relocation module is operative to set a trust attribute of the at least one function to 1 if the full version is reachable, and wherein the program forming module is operative to include only the full version of the at least one function in the executable program if the trust attribute is set to 1, regardless of whether the called status of the reduced version becomes reachable before or after the trust attribute is set.

15. The computing device of claim 11, wherein a full version of the at least one function is used for acting on values including floating point numbers and a reduced version of the at least one function is used for acting on values not including floating point numbers.

16. The computing device of claim 9, wherein the relocation module is operative to perform the step of reading the section data and the relocation instructions one or more times until the attributes for all functions have been set and all occurrences of the function have been read.

17. The computing device of claim 9, wherein the attribute assigning module is operative to assign attributes to functions from the plurality of functions using a relocation instruction which is capable of attaching an attribute to a symbol.

18. A computing device programmed to implement a system for linking a plurality of object code modules to form an executable program, the system comprising:
an attribute assigning module operative to assign an attribute to a function from a plurality of functions associated with relocation instructions, wherein the plurality of functions is specified by section data included in at least one of the object code modules and the relocation instructions are specified by a non-bit relocation section included in the at least one object code module, and
wherein at least one function of the plurality of functions is called in the executable program, to indicate whether the at least one function is reachable;
a relocation module to determine, for the function, whether the function is reachable based at least in part on the relocation instructions and to set the attribute of the function to indicate that the function is reachable, if it is determined that the function is reachable; and
a linker to link the object code modules to produce the executable program based at least in part on the relocation instructions, including reading the attributes of the functions, to only include functions with an indicated called status of reachable.

19. The computing device of claim 18, wherein the linker comprises means for linking the object code modules based at least in part on the relocation instructions.

20. The computing device of claim 18, wherein the relocation module comprises means for determining whether the function is reachable based at least in part on the relocation instructions.

21. The computer program product of claim 10, wherein the computer program product is operative to cooperate with the linker to determine whether the function is reachable based at least in part on one or more of the relocation instructions.

* * * * *

UNITED STATES PATENT AND TRADEMARK OFFICE
CERTIFICATE OF CORRECTION

| | |
|---|---|
| PATENT NO. | : 7,299,462 B2 |
| APPLICATION NO. | : 09/850666 |
| DATED | : November 20, 2007 |
| INVENTOR(S) | : Richard Shann and Stephen Jones |

It is certified that error appears in the above-identified patent and that said Letters Patent is hereby corrected as shown below:

Col. 11, lines 9 and 11 should read:
final executable program 5 might include sequence O2 only, sequences O1,O3 having been deleted by the linker because of the relocations R1,R3. In that case, sequence O2 has been Claim 5, col. 20, line 18 should read:
to 1 and, if said trust attribute is set to 1, only the full Claim 10, col. 21, line 6 should read:
reachable, in order to determine one or more functions from Signed and Sealed this Eighteenth Day of March, 2008

JON W. DUDAS
*Director of the United States Patent and Trademark Office*